[2,816,128]

Patented Dec. 10, 1957

2,816,128

PHOSPHATE ESTERS OF OXIMES

James Forrest Allen, South Charleston, W. Va., assignor to Food Machinery and Chemical Corporation, New York, N. Y., a corporation of Delaware No Drawing. Application July 27, 1956,
Serial No. 600,365

7 Claims. (Cl. 260—461)

This invention relates to the preparation of a new class of esters of organic phosphorus compounds and more particularly to a new class of esters of phosphoric acid.

These new compounds may be regarded as oxygen-substituted derivatives of oximes, and may be represented by the following general formula:

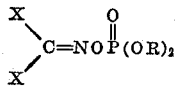

in which X may be halogen, hydrogen or any organic radical, and R represents any organic radical.

Numerous individual members of this novel class of compounds have been prepared by two methods. One of these methods involves the reaction between an α-halonitro compound and a completely esterified ester of phosphorous acid. Such a reaction may be represented by the following typical equation:

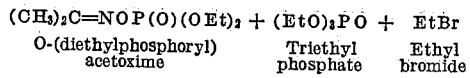

Another method for the preparation of individual members of this novel class of compounds involves the reaction between an oxime and an ester of chlorophosphoric acid in the presence of a base, and may be exemplified by the following typical equation:

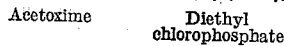

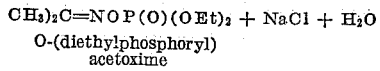

The first method has a wider field of application, and is a preferred method of preparing certain classes of oxime derivatives. The second method is of interest because it additionally affords some proof of the structure of the products, but is usually limited to the preparation of compounds which have hydrogen or organic radicals as X in the general formula given above. However, for the preparation of certain compounds the oxime intermediate would doubtless be more readily obtainable than the nitro derivative, and so this method is advantageously used under such circumstances. These methods have not previously been used to prepare the novel compounds of the type disclosed and claimed herein.

While I do not wish to be limited by any theory of the mechanism of the reaction, it appears that the first type of reaction involves an oxidation-reduction reaction. The equation indicates that one mole of nitro compound reacts with two moles of phosphite ester, forming one mole of the phosphate product. Presumably, one mole of phosphite ester reduces the nitro compound to the corresponding nitroso compound, which then reacts with the second mole of phosphite.

An α-halonitro compound is any compound having a nitro group and one or more halogen atoms attached to the same carbon and could be represented by the formula >CYNO$_2$, in which Y is halogen. The other two valence bonds of the carbon atom would normally be attached to halogen, hydrogen, or an organic radical. The preferred halogen derivatives of the nitro compounds are the chlorine and bromine derivatives.

Among the many phosphite esters which may be used, the triethyl phosphite is preferred. At least one of the organic radicals present in the phosphite ester must be an alkyl radical, since it was found that the presence of three aromatic radicals gave an anomalous reaction.

The first type of reaction may suitably be conducted under widely varying conditions, depending upon the reactivities of the compounds, but I prefer to gradually add one of the reactants to the other at temperatures ranging from about 0° C. to about 100° C. A solvent is not usually necessary, but if both of the reactants are highly active, as for example in the case of chloropicrin and triethyl phosphite, it is preferable to use an inert solvent, such as a hydrocarbon or a chlorinated hydrocarbon, to moderate the reaction. It is also preferable to use the proportion of reactants which is indicated by the equation, i. e. the stoichiometric quantities.

The following examples of the preparation of some members of this novel class of compounds are illustrative only, and are not to be construed as limiting the scope of the invention:

Example 1

One mole of triethyl phosphite (166 g.) was added dropwise with cooling and stirring to 0.5 mole of 2-bromo-2-nitropropane (84.5 g.) at 55–60° C. until about 15 ml. of the phosphite had been added. The addition of the phosphite was then stopped until the reaction began to subside and the process was then repeated until all the phosphite had been added. The reaction mixture was then heated to 75–85° C. for 30 minutes and the pressure in the reactor then reduced by a water pump to remove the by-product ethyl bromide. The latter, 51 g. (94% yield) was collected in a trap cooled by Dry Ice and trichloroethylene. When distilled at 0.2 mm. pressure practically all of the product distilled from 63° C. to 129° C. Redistillation of this mixture through a 10″ Vigreux column gave 98 g. distilling from 57° C. to 85.5° C. (0.4 mm.), which is 108% of theory for triethyl phosphate, and 66.5 g. distilling from 101 to 110° C. (0.2 mm.), which is 64% of theory for O-(diethylphosphoryl) acetoxime. Two additional distillations of this product gave almost pure product boiling at 95 to 98.5° C. (0.2 mm.) and having $n^{25}$D, 1.4359 and $d$ 35/4, 1.0949. Anal.: Calcd. for C$_7$H$_{16}$NO$_4$P: P, 14.8%. Found: P, 15.2%.

Example 2

To 57.6 g. (0.4 mole) of 1,1-dichloro-1-nitroethane was added over a 2-hour period 133 g. (0.8 mole) of triethyl phosphite, the temperature being held at 25–30° C. by external cooling. The temperature of the reaction mixture was then slowly raised to 100° C. and 16.5 g. of ethyl chloride was collected in a cold trap to which the reactor was connected. Reduction of pressure in the reactor gave an additional 3.3 g. of ethyl chloride, making a total of 19.8 g. (77% of theory). The product was distilled at 1mm. pressure to a vapor temperature of 102° C. and the distillate partially rectified at 1.5 mm. pressure by means of a 20 inch column packed with ⅛-inch glass helices. The product obtained in the rectification from 38° to 70° C. (mostly between 65° and 70°

C.) weighed 67 g. and corresponded to a yield of 92% of triethyl phosphate. The infrared spectrogram prepared from this product was essentially identical with the spectrogram prepared from an authentic sample of triethyl phosphate.

The higher boiling product, O-(diethylphosphoryl)-1-chloracetaldoxime, could not be distilled through the column, so the latter was replaced with a condenser for the remainder of the distillation. There was obtained 59.5 g. (65% yield) distilling from 105° to 115° C. at 1 mm. pressure and having $n^{35}D$, 1.4390 and $d$ 35/4, 1.2100. Anal.: Calcd. for $C_6H_{13}ClNO_4P$: Cl, 15.4%; P, 13.5%. Found: Cl, 16.4%, P, 13.6%.

Example 3

A solution containing 65.8 g. (0.4 mole) of chloropicrin ($Cl_3CNO_2$) and 50 ml. of carbon tetrachloride was cooled to below 0° C. and 66.5 g. (0.4 mole) of triethyl phosphite added gradually with stirring and cooling to maintain the temperature at 0° to −20° C. The temperature was then raised to 20° C. and an additional 66.5 g. of triethyl phosphite added. When addition of the phosphite was complete, stirring was continued for 1 hour at room temperature. Raising the temperature to 73° C. gave 11 g. ethyl chloride (collected in a cold trap) and an additional 14.5 g. of ethyl chloride was recovered from the carbon tetrachloride, making a total of 25.5 g. ethyl chloride or 99% of theory. After removal of the carbon tetrachloride at reduced pressure the product was distilled through a 10″ Vigreux column at a pressure of approximately 1 mm. until the pot temperature reached 108° C. This distillation removed the by-product triethyl phosphate and other low-boiling material. The column was then removed and the product, O-(diethylphosphoryl) dichloroformoxine, distilled through a condenser at approximately 1 mm. The yield of product was 49.2 g. (49%), distilling at 90–103° C. and having $n^{35}D$, 1.4434 and $d$ 35/4, 1.3106. Anal.: Calcd. for $C_5H_{10}Cl_2NO_4P$: Cl, 28.4%; P, 12.4%. Found: Cl, 28.1%; P, 12.9%.

Example 4

O-(diethylphosphoryl) acetoxime, the product of Example 1, was also prepared from acetoxime and diethyl chlorophosphate. To a solution of 20 g. (0.5 mole) of sodium hydroxide in 100 ml. of water cooled to 10° C. was added 40 ml. (0.54 mole) of acetone and 14 g. (0.2 mole) hydroxylamine hydrochloride. The homogeneous mixture was shaken for 10 minues, cooled to 0° C. and 34.5 g. (0.2 mole) diethyl chlorophosphate added gradually with shaking at 15–17° C. Shaking was continued for 30 minutes and the two layers separated. The lower aqueous layer was extracted with ether, the ether extract added to the product and dried. Evaporation of the ether and distillation at 0.2 mm. pressure gave 14 g. (33.5%) of product boiling at 95–98° C. and having $n^{25}D$, 1.4358 and $d$ 35/4, 1.0940. Anal.: Calcd. for $C_7H_{16}NO_4P$: P, 14.8%. Found: P, 15.0%. Infrared spectograms of this product and the product of Example 1 were essentially identical.

Example 5

To 19.4 g. benzaldoxime (obtained from equimolar quantities of benzaldehyde, hydroxylamine and sodium hydroxide) was gradually added equimolar quantities of pyridine (12.6 g.) and diethyl chlorophosphate (27.6 g.), cooling to about 0° C. The mixture was stirred at room temperature for 1 hour and at 50° to 60° C. for 1 hour. Ether was then added to the reaction mixture and the pyridinium chloride removed by filtration. Removal of the solvent in vacuo gave 36.5 g. (38% yield) of O-(diethylphosphoryl) benzaldoxime. Anal.: Calcd. for $C_{11}H_{16}NO_4P$: P, 12.1%. Found: P, 11.9%. This product decomposed when distillation was attempted at 1 mm. pressure.

The products of this invention were tested as pesticides by formulating as 15% wettable powders and suspending in water to give the desired concentration of active ingredient. The wettable powders were prepared by grinding together a mixture of 15% by weight of the oxime derivative, 82% of an inert diluent, and 3% of wetting agent. The inert diluent was a hydrated aluminum magnesium silicate, such as Attapulgus Clay Company's "Attaclay," and the wetting agent was an alkyl aryl polyether alcohol, such as Rohm & Haas Company's "Triton X–100." When applied as a spray at a concentration of 0.125% the percentages of the various test organisms killed are shown in the following table:

| Compound | 2-Spotted Mite | Milkweed Bug | Mexican Bean Beetle | Pea Aphid | German Roach | Army Worm | Flour Beetle | Grain Weevil |
| --- | --- | --- | --- | --- | --- | --- | --- | --- |
| O-(diethylphosphoryl) dichloroformoxime | 51 | 0 | 100 | 100 | 0 | 100 | | |
| O-(diethylphosphoryl) acetoxime | 89 | 30 | 60 | 0 | 80 | 0 | 45 | |
| O-(diethylphosphoryl) benzaldoxime | 100 | 100 | 60 | 0 | 100 | 0 | | 100 |

The compounds of this invention may also be used in other types of formulations, such as in miscible oil or aqueous emulsions.

This application is a continuation-in-part of my copending application, Serial No. 367,093, filed July 9, 1953, and now abandoned.

It will be obvious to those skilled in the art that the foregoing description and examples of the new class of compounds and their preparation may be utilized in the preparation of many additional members of the class, without departing from the scope of this invention and the claims appearing below.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

That which is claimed as patentably novel is:

1. Phosphate esters of oximes having the general formula:

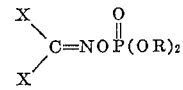

wherein X is a member selected from the group consisting of chlorine, bromine and hydrogen atoms and phenyl and lower alkyl radicals; and R is a lower alkyl radical.

2. O-(diethylphosphoryl)-1-chloroacetaldoxime.
3. O-(diethylphosphoryl) dichloroformoxime.
4. O-(diethylphosphoryl) acetoxime.
5. O-(diethylphosphoryl) benzaldoxime.
6. A method of preparing phosphate esters of oximes having the general formula:

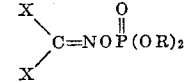

wherein X is a member selected from the group consisting of chlorine, bromine and hydrogen atoms, and phenyl and lower alkyl radicals, and R is a lower alkyl radical, which comprises reacting an α-halonitro compound have the general formula:

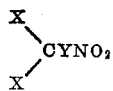

wherein X is a member selected from the group consisting of chlorine, bromine and hydrogen atoms, and phenyl and lower alkyl radicals, and Y is a member selected from the group consisting of chlorine and bromine; with a tertiary phosphite ester containing at least one lower alkyl radical; and recovering the oxime derivative from the reaction product.

7. The method of claim 6, wherein the tertiary phosphite ester is triethyl phosphite.

No references cited.